Jan. 25, 1966   R. P. LAZICH   3,231,024
POWER MOWER EDGING ATTACHMENT
Filed March 3, 1964   2 Sheets-Sheet 2
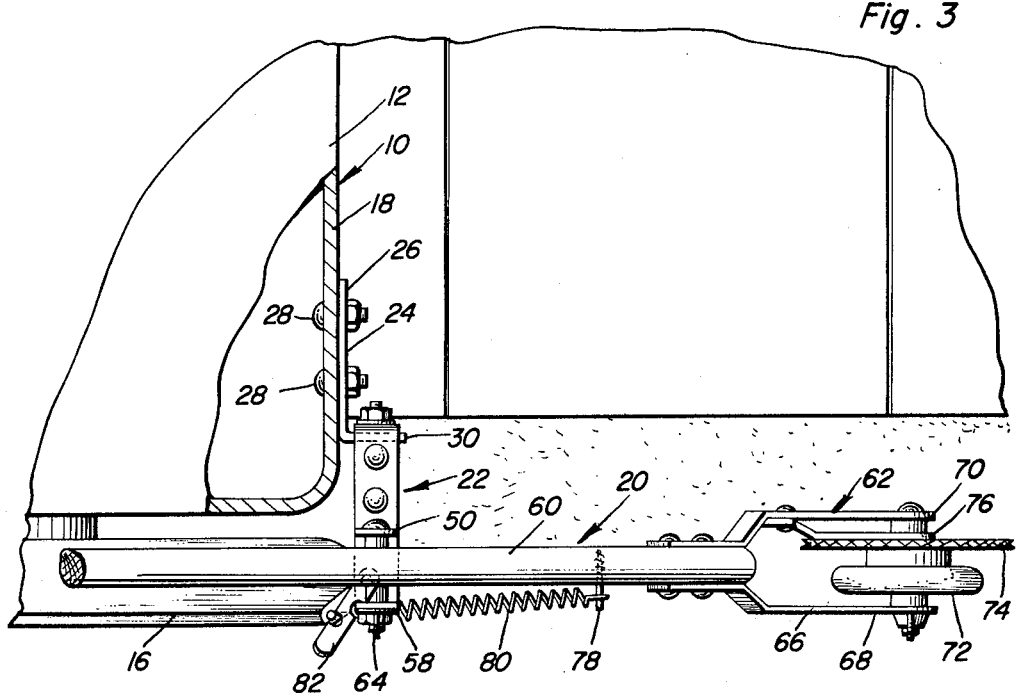
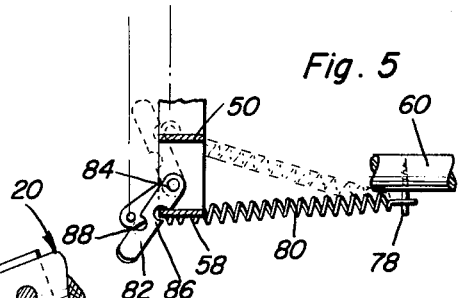
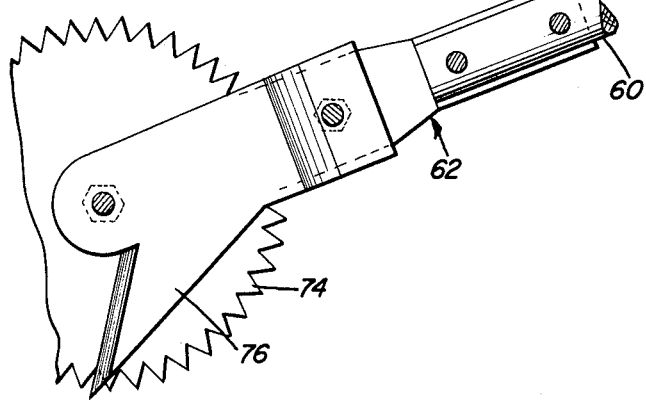
Radovan P. Lazich
INVENTOR.

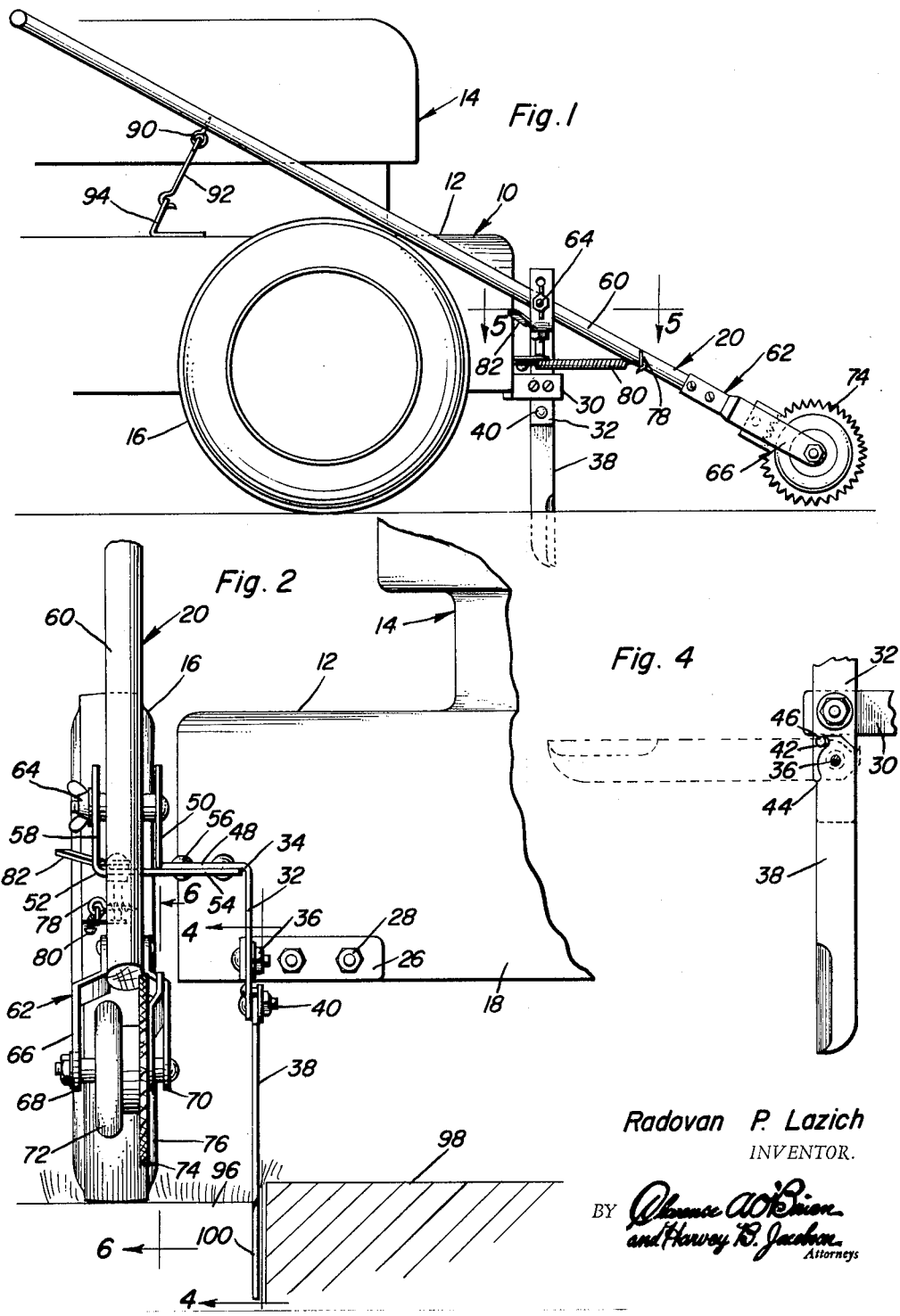

United States Patent Office 3,231,024
Patented Jan. 25, 1966

3,231,024
POWER MOWER EDGING ATTACHMENT
Radovan P. Lazich, 2735 Kroy Way, Sacramento, Calif.
Filed Mar. 3, 1964, Ser. No. 348,996
4 Claims. (Cl. 172—14)

This invention relates to a novel and useful attachment for a wheeled mower frame and more specifically to a two-part edging attachment including first means adapted to be moved along a sidewalk or curb and to groove the edge of the lawn immediately adjacent the curb or sidewalk and second means adapted to be moved along a sidewalk or curb and to edge the grass immediately adjacent the curb or sidewalk line.

The edging attachment of the instant invention is primarily designed for use on a self-propelled power mower of the rotary type but is also particularly well adapted for use on reel-type mowers. Still further, the edging attachment of the instant invention can also be advantageously employed when secured to hand-propelled mowers of both the reel and rotary types.

The edging attachment of the instant invention includes a first part in the form of a retractible knife blade which may be moved from a raised inoperative position to a lowered depending operative position and utilized to groove the lawn immediately adjacent the sidewalk as the mower to which the attachment is secured moves along the edge of the lawn. Still further, the edging attachment includes a second portion in the form of a conventional hand-operable rotary edger of conventional design including an elongated handle and the hand-operable rotary edger is pivotally supported for movement about a horizontal axis extending transversely of the associated mower and is yieldingly urged to a position with its friction drive wheel disposed in rolling frictional engagement with the sidewalk adjacent the edge thereof which is to be trimmed. In this manner, the edging attachment of the instant invention may not only be utilized to form a groove in the line immediately adjacent the sidewalk but to also clip the grass immediately adjacent the sidewalk. In most instances the hand-operable rotary edger portion of the attachment will be used after the edging operation has been initially completed at the beginning of the grass cutting season inasmuch as the rotary edger also includes a depending blade portion for grooving the lawn immediately adjacent the sidewalk along which the rotary edger is being moved. The depending knife blade portion of the attachment is primarily designed to effect the initial grooving of the lawn along a sidewalk which is to be trimmed, the initial groove formed by the knife blade normally remaining between cuttings of the grass.

The main object of this invention is to provide an attachment for a lawn mower including means by which the edge of the lawn immediately adjacent the sidewalk may be grooved and second means adapted to clip the grass along the sidewalk as the mower is moved along the edge of the lawn.

A further object of this invention is to provide an edging attachment for mowers including means by which a conventional hand-operable rotary edger may be supported therefrom and utilized in the conventional manner by moving the mower to which the attachment is secured along the edge of the lawn.

Yet another object of this invention is to provide a mower edging attachment including means by which each portion thereof may be selectively retained in an inoperative position thereby enabling the other portion to be independently utilized.

A final object of this invention to be specifically enumerated herein is to provide an edging attachment for mowers in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional form of mower shown with the edging attachment of the instant invention mounted thereon and the grooving portion of the attachment in an operative position and the grass cutting portion of the attachment in an inoperative position;

FIGURE 2 is a somewhat enlarged fragmentary front elevational view of the embodiment illustrated in FIGURE 1;

FIGURE 3 is a top plan view of the embodiment illustrated in FIGURE 1 and with parts of the mower frame being broken away and shown in section to more clearly illustrate the manner in which the attachment is secured to the mower frame;

FIGURE 4 is a fragmentary vertical sectional view taken substantially upon a plane indicated by the section line 4—4 of FIGURE 2;

FIGURE 5 is a fragmentary enlarged horizontal sectional view taken substantially upon a plane indicated by the section line 5—5 of FIGURE 1; and FIGURE 6 is an enlarged fragmentary vertical sectional view taken substantially upon the plane indicated by the section line 6—6 of FIGURE 2.

Referring now more specifically to the drawings the numeral 10 generally designates a conventional form of rotary mower including a main frame 12 from which a motor assembly 14 of conventional design is supported. The frame 12 includes a plurality of ground-engaging support wheels 16 and it may be seen from FIGURES 2 and 3 of the drawings that the front of the frame 12 includes a depending front wall 18. The attachment of the instant invention is generally referred to by the reference numeral 20 and includes a mounting bracket assembly generally referred to by the reference numeral 22. The assembly 22 includes a first L-shaped bracket 24 including a first horizontal leg 26 which extends transversely of the lower edge portion of the front wall 18 and is secured thereto in any convenient manner such as by removable fasteners 28. The bracket 24 includes a second forwardly directed horizontal leg 30 which has the depending leg 32 of a Z-shaped bracket 34 secured thereto in any convenient manner such as by a removable fastener 36. An elongated knife blade 38 is provided and has one end portion thereof secured to the lower end of the depending leg 32 in any convenient manner such as by a removable fastener 40. From FIGURE 4 of the drawings it may be seen that the blade 38 defines a pair of abutments 42 and 44 which are selectively engageable with the stop pin 46 supported from and projecting laterally outwardly of the depending leg 32 for forming a limit of movement of the blade 38 toward the depending operative position and the forwardly projecting inoperative position illustrated in phantom lines in FIGURE 4 of the drawings.

The Z-shaped bracket 34 includes a horizonal leg 48 which projects laterally outwardly from the upper end of the depending leg 32 and terminates at its free end in an upstanding leg 50. An L-shaped bracket 52 includes a horizontal leg 54 whose free end portion underlies and is secured to the horizontal leg 48 in any convenient manner such as by fasteners 56 and an upstanding leg 58 which generally parallels the upstanding leg 50. The upstanding legs 50 and 58 and the end portion of the horizontal leg 54 adjacent the upstanding leg 58 define an upwardly opening generally U-shaped channel or bracket. The elongated handle 60 of a hand-operable rotary edger generally referred to by the reference numeral 62 and of substantially conventional design is received between the legs 50 and 58 and pivotally supported therebetween by means of a removable pivot fastener 64 secured between the legs 50 and 58 and passing through the handle 60. It may be seen that the hand-operable rotary edges 62 includes a bifurcated lower end portion 66 between whose furcations 68 and 70 a friction driving wheel 72 and a toothed cutter wheel 74 are journaled. The driving wheel 72 is drivingly connected to the toothed cutter wheel 74 and the hand operable rotary edger 62 includes a stationary blade 76 which cooperates with the toothed blade 74 to cut the grass adjacent the edge of a sidewalk.

The attachment 20 further includes an anchor eye 78 which is secured to the handle 60 in a conventional manner and an anchor pin 80 which is secured to and depends from the free end of a lever 82 which is pivotally supported from the horizontal leg 54 by means of a pivot pin 84. It may be seen that the pivot pin 84 is disposed closer to the leg 58 than to the leg 50, see FIGURE 5, and therefore that when the lever 82 is abutted against the leg 58 with the latter received in the notch 86 formed in the lever 82, the expansion spring 88 secured between the anchor eye 78 and the anchor pin 80 is expanded to a greater degree than when the lever 82 is pivoted to the position illustrated in phantom lines in FIGURE 5 of the drawings with the leg 50 received in the notch 88 formed in the lever 82. Accordingly, it may be seen that the tension of the spring 88 may be varied as desired.

With attention now invited to FIGURE 1 of the drawings it may be seen that an anchor eye 90 is secured to the end of the handle 60 remote from the anchor eye 78 and that a hook 92 is pivotally supported from the anchor eye 90 for engagement with the apertured upper end of an anchor flange 94 supported from the top wall of the frame 12. In this manner, the hand-operable rotary edger may be maintained in a raised inoperative position such as that illustrated in FIGURE 1 of the drawings by means of engagement of the hook 92 with the anchor flange 94. In addition, it is to be noted that the fastener 40 may be tightened when the blade 38 is in the raised inoperative position illustrated in phantom lines in FIGURE 4 of the drawings so as to frictionally retain the blade 38 in the raised inoperative position.

Inasmuch as the pivot fastener or pin 64 is removable, it may be seen that the handle 60 may be removed and rotated 180 degrees about its longitudinal axis if desired. In addition, a second anchor eye corresponding to the anchor eye 90 may also be provided and positioned so as to project to the side of the handle 60 remote from the anchor eye 90. Still further, the second anchor eye (not shown) adjacent the anchor eye 90 may also be provided with a hook (not shown) similar to the hook 92 for securing the rotary edger 62 in the raised inoperative position when the handle 60 thereof is rotated 180 degrees from the position illustrated in FIGURE 1 of the drawings.

In operation, if it is desired to groove the lawn 96 adjacent the sidewalk 98, the blade 38 is dropped to the depending operative position illustrated in solid lines in FIGURE 4 of the drawings. Then, the mower 10 may be moved along the sidewalk 98 in order that the lower end of the blade 38 may cause the lawn immediately adjacent the sidewalk 98 to be grooved as at 100. Thereafter, the knife 38 may be raised and frictionally retained in the inoperative position and the rotary edger may be released from engagement with the anchor flange 94 and utilized to clip the grass of the lawn 96 along the sidewalk 98.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a wheeled mower frame, an edging attachment, said attachment including a mounting bracket supported from said frame, a hand operable rotary edger including an elongated handle extending forwardly from said frame having a first wheel driven toothed rotary cutter blade journaled from one end of said handle cooperating with a second stationary cutter blade fixed on said one end of said handle and generally paralleling and disposed immediately adjacent the plane in which said rotary cutter blade is rotatable, means pivotally securing said handle to said mounting bracket for rotation about an axis extending transversely of said handle, generally paralleling the axis of rotation of said rotary cutter blade and spaced from said one end of said handle, a substantial portion of said elongated handle extending rearwardly from said pivot means, elongated expansion spring means connected to and extending between said handle and said bracket yieldably urging rotation of said handle in a direction to place said rotary cutter blade in engagement with the ground, said attachment including means independent of rotation of said handle relative to said bracket for varying the distance between the points at which said expansion spring means is effectively connected to said handle and said bracket.

2. The combination of claim 1 wherein said handle and said mower frame includes means for releasably anchoring said handle against rotation in said one direction and with said rotary cutter blade disposed above the lower portion of the wheels of said mower frame.

3. The combination of claim 1 including a third upstanding elongated edging blade pivotally supported at its upper end portion from said bracket for pivotal movement about an axis extending transversely of said mower frame between a depending lower position with the lower end of said elongated blade projecting below the wheels of said frame and a raised position with the free end of said elongated blade swung forwardly and upwardly above the lowermost portions of said wheels.

4. In combination with a wheeled mower frame, an edging attachment, said attachment including a mounting bracket supported from said frame, a hand operable rotary edger including an elongated handle having a first wheel driven toothed rotary cutter blade journaled from one end of said handle cooperating with a second stationary cutter blade fixed on said one end of said handle and generally paralleling and disposed immediately adjacent the plane in which said rotary cutter blade is rotatable, means pivotally securing said handle to said mounting bracket for rotation about an axis extending transversely of said handle generally paralleling the axis of rotation of said rotary cutter blade and spaced from said one end of said handle, elongated expansion spring means connected to and extending between said handle and said bracket yieldably urging rotation of said handle in a direction to place said rotary cutter blade in engagement with the ground, said attachment including means independent of rotation of said handle relative to said bracket for varying the distance between the points at which said expansion spring means is effectively connected to said handle and said bracket, a third upstanding elongated edging blade pivotally supported at its upper end portion from said bracket for pivotal movement about an axis extending transversely of said mower frame between a depending lower position with the lower end of said elongated blade projecting below the wheels of said frame and a raised position with the free ends of said elongated blade swung forwardly and upwardly above the lowermost portions of said wheels, said bracket including a pair of spaced upstanding legs between which said handle is pivotally supported, an elongated lever pivotally secured at one end to said bracket for rotation about an upstanding axis and for swinging movement of the free end thereof between said legs with the latter engageable by said lever to define two limit positions of swinging movement of said lever, one end of said expansion spring means being secured to the free end of said lever and being spaced different distances from the other end of said spring means in said two positions of movement of said lever and swingable past a center position when said lever is swung between said two limit positions, the latter defining two overcenter positions.

References Cited by the Examiner

UNITED STATES PATENTS

| | | | |
|---|---|---|---|
| 801,122 | 10/1905 | West | 56—251 |
| 1,065,946 | 7/1913 | Janson | 56—251 |
| 1,103,101 | 7/1914 | Thompson | 172—705 |
| 1,858,031 | 5/1932 | Bennet et al. | 56—251 |
| 2,771,730 | 11/1956 | True | 56—256 X |
| 2,775,856 | 1/1957 | Hoch | 172—14 X |
| 3,003,301 | 10/1961 | Koon | 56—256 |
| 3,018,599 | 1/1962 | Rambo | 56—256 |
| 3,019,585 | 2/1962 | Wellborn | 56—256 X |
| 3,047,999 | 8/1962 | Chadwick | 56—256 |
| 3,057,411 | 10/1962 | Carlton | 56—256 |

ABRAHAM G. STONE, *Primary Examiner.*